United States Patent
Bae

(10) Patent No.: US 8,882,859 B2
(45) Date of Patent: Nov. 11, 2014

(54) METHOD FOR MANUFACTURING METAL SEPARATOR FOR FUEL CELL

(75) Inventor: Dong Gwan Bae, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 1687 days.

(21) Appl. No.: 11/837,422

(22) Filed: Aug. 10, 2007

(65) Prior Publication Data

US 2008/0134496 A1   Jun. 12, 2008

(30) Foreign Application Priority Data

Dec. 12, 2006   (KR) .......................... 10-2006-0126285

(51) Int. Cl.
*H01M 8/02* (2006.01)

(52) U.S. Cl.
USPC .......... 29/623.2; 429/456; 429/460; 429/508; 429/514; 429/535

(58) Field of Classification Search
IPC ............. H01M 8/0202,8/0206, 8/0254, 8/0271, H01M 8/0267, 8/0276, 8/0297; Y02E 60/50
See application file for complete search history.

(56) References Cited

U.S. PATENT DOCUMENTS

| | | | | |
|---|---|---|---|---|
| 4,881,348 A * | 11/1989 | Davis | ........................... | 52/127.7 |
| 5,378,247 A | 1/1995 | Sasaki et al. | | |
| 5,776,624 A * | 7/1998 | Neutzler | ....................... | 429/437 |
| 7,732,082 B2 * | 6/2010 | Hayashi et al. | ............... | 429/460 |
| 2002/0117780 A1* | 8/2002 | Inoue et al. | ................... | 264/299 |
| 2002/0140124 A1* | 10/2002 | Rutsch | ........................... | 264/138 |
| 2004/0072053 A1 | 4/2004 | Schlag | | |
| 2005/0031936 A1* | 2/2005 | Joos | ................................ | 429/38 |
| 2005/0173833 A1* | 8/2005 | Cummins | ................ | 264/272.11 |

FOREIGN PATENT DOCUMENTS

| | | |
|---|---|---|
| JP | 63-053857 | 3/1988 |
| JP | 01-211864 | 8/1989 |
| JP | 08-255616 | 10/1996 |
| JP | 11-097039 | 4/1999 |
| JP | 2004-55248 A | 2/2004 |
| JP | 2004-139829 | 5/2004 |
| JP | 2006-114444 A | 4/2006 |
| JP | 2006-228580 A | 8/2006 |
| JP | 2007-220403 A | 8/2007 |
| JP | 2008-78050 A | 4/2008 |
| WO | WO2005/104287 | * 11/2005 |
| WO | WO 2007044045 | * 6/2007 |

* cited by examiner

*Primary Examiner* — Alix Echelmeyer
(74) *Attorney, Agent, or Firm* — Morgan, Lewis & Bockius LLP

(57) ABSTRACT

A method of manufacturing a metal separator for a fuel cell includes molding two plates such that each plate has a least one concave portion and at least one convex portion, applying a sealant to a sealing portion of at least one of the plates, arranging the plates such that the concave portions of each plate are opposite the convex portions of the other plate, and spot welding the plates together. The sealing portion may be near an edge of the separator, between a hydrogen manifold, an oxygen manifold, and a coolant manifold. A sealant leakage prevention groove may further be provided at the sealing portion. The sealing portion may be made by being inserted between a projection on a first mold and a recess on a second mold, and a spot welding gun may be inserted through a guide hole in one of the molds.

4 Claims, 3 Drawing Sheets

METHOD FOR MANUFACTURING METAL SEPARATOR FOR FUEL CELL

CROSS-REFERENCE TO RELATED APPLICATION

This application claims the benefit under U.S.C. §119(a) of Korean Patent Application No. 10-2006-0126285, filed on Dec. 12, 2006, the entire contents of which are incorporated herein by reference.

BACKGROUND OF THE INVENTION

1. Field of the Invention

The present invention relates to a method of manufacturing a metal separator for a fuel cell.

2. Description of Related Art

In portable electronic devices, such as cellular phones, two-way radios, and notebook computers, a small-scale fuel cell stack may be a proper alternative power source, replacing batteries. In addition to being pollution-free, fuel cell stacks provide increased convenience in not needing to be recharged.

To manufacture a fuel cell stack, membrane electrode assemblies (MEAs) are layered with interposing separators therebetween. The separators uniformly supply hydrogen and oxygen to the MEAs, and electrically connect the MEAs in series.

The separators are usually made of graphite. However, the cost and time associated with machining graphite are high.

Metal separators have also recently been used. A metal separator includes flow paths for supplying hydrogen, oxygen, and coolant, and supports the MEA. If airtightness is not maintained, the coolant may leak to contaminate the MEA, rendering the contaminated cell useless. In addition, there is a possibility of fire if hydrogen leaks.

In order to maintain the airtightness, a rubber seal is inserted into both ends of upper and lower plates, thus maintaining the airtightness of the metal separator and connecting the upper and lower plates to each other using an adhesive force of the rubber seal. The plates are sealed and bonded manually.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Exemplary embodiments of the present invention provide a method of manufacturing a metal separator for a fuel cell, including molding two plates such that each plate has a least one concave portion and at least one convex portion, applying a sealant to a sealing portion of at least one of the plates, arranging the plates such that the concave portions of each plate are opposite the convex portions of the other plate, and spot welding the plates together.

The sealing portion may be near an edge of the separator, between a hydrogen manifold, an oxygen manifold, and a coolant manifold. A sealant leakage prevention groove may further be provided at the sealing portion. The sealing portion may be made by being inserted between a projection on a first mold and a recess on a second mold, and a spot welding gun may be inserted through a guide hole in one of the molds.

BRIEF DESCRIPTION OF THE DRAWINGS

The above and other features of the present invention will be described with reference to certain exemplary embodiments thereof illustrated the attached drawings in which.

DETAILED DESCRIPTION OF THE PREFERRED EMBODIMENTS

Figure 1:
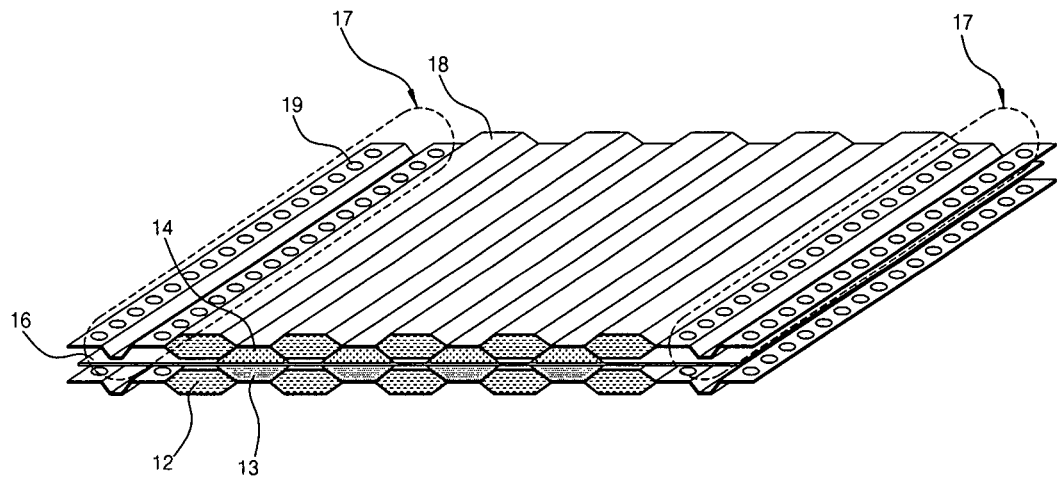
FIG. 1 is a perspective view depicting a metal separator welded by spot welding in accordance with an exemplary embodiment of the present invention.
Figure 2:
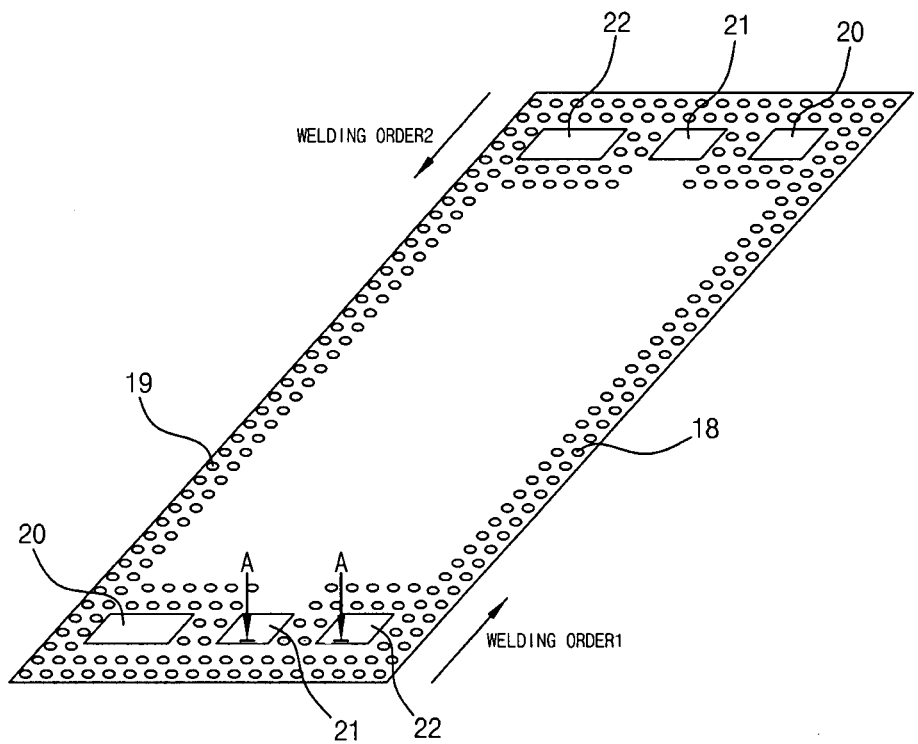
FIG. 2 is a schematic diagram depicting spot-welded portions of the separator of FIG. 1.
Figure 3:
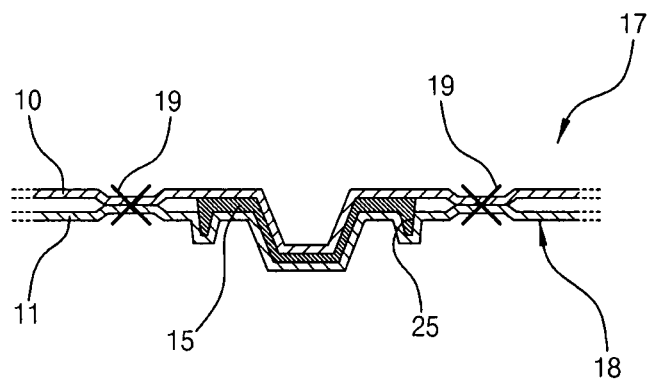
FIG. 3 is a sectional view taken along line A-A of FIG. 2 depicting welded portions for maintaining airtightness by manifolds (channels)

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

A method of molding a metal separator in accordance with an exemplary embodiment of the present invention includes cutting two plates; bending the resulting plates using a press machine (mold); and placing a first of the plates, 10, on top of a second of the plates, 11, so that concave portions of each plate, formed in the bending step, face convex portions of the other plate.

In more detail, the first plate 10 includes zigzag concave and convex portions, such as the trapezoidal portions shown. The second plate 11 has the same shape as the first plate 10. The second plate 11 is flipped 180 degrees so that its concave and convex portions abut corresponding convex and concave portions, respectively, of the first plate 10. The two plates 10 and 11 are then connected, providing hexagonal coolant flow paths 12. A hydrogen flow path 13 of the first plate 10 and an oxygen flow path 14 of the second plate 11 are also established between the coolant flow paths 12.

A pair of separators 18, each made of the first plate 10 and the second plate 11, are stacked by interposing an MEA 16 therebetween. Oxygen is supplied to an oxygen electrode on the upper part of the MEA 16, and hydrogen is supplied to a hydrogen electrode on the lower part of the MEA 16.

Figure 4:
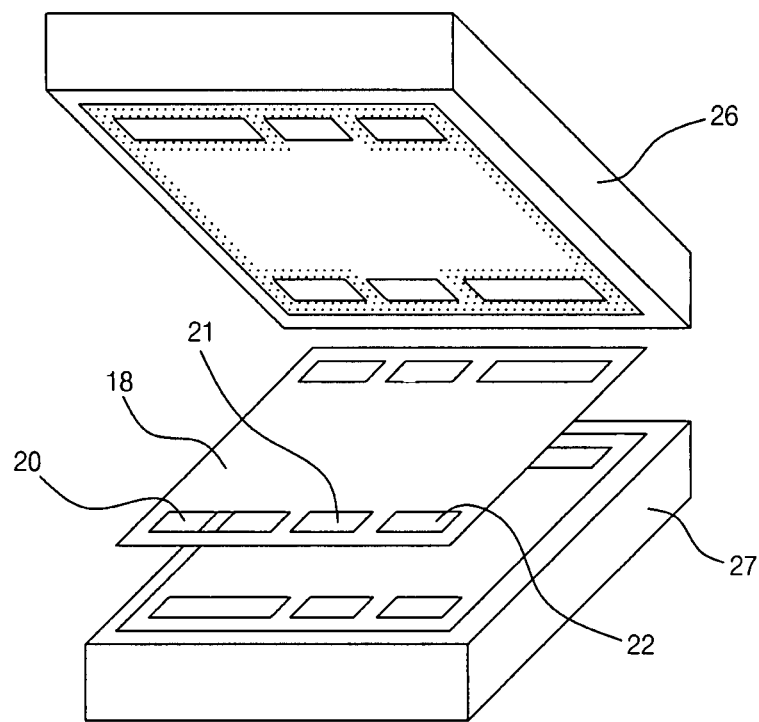
FIG. 4 is a schematic diagram depicting shapes of upper and lower molds and a separator in accordance with an exemplary embodiment of the present invention.
Figure 5:
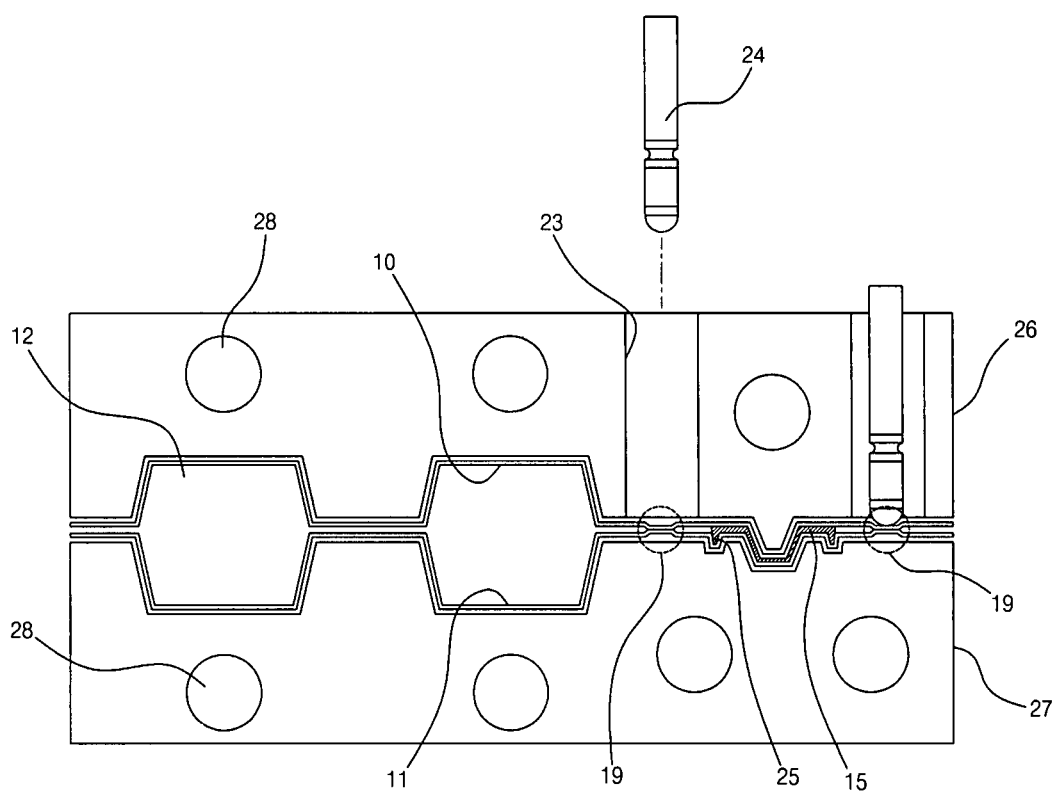
FIG. 5 is a sectional view illustrating a spot welding process in accordance with an exemplary embodiment of the present invention.

Referring to FIG. 4, in order to maintain airtightness of the separator 18, the first plate 10 and the second plate 11 are placed overlapping each other to be molded in a concave-convex shape using upper and lower molds 26 and 27.

A trapezoidal projection is provided on the lower end of the upper mold 26 and a recess having a shape corresponding to that of the projection is provided on the upper end of the lower mold 27. Accordingly, while pressurizing both ends of the first plate 10 and the second plate 11, placed overlapping each other between the projection and the recess, a trapezoidal sealing portion 17 is formed.

A compound 15, such as a viscous liquid sealer, is automatically applied between the sealing portion 17 and a groove 25 for preventing the compound from leaking.

Spot welding is performed on each side of the grooves 25 to bond the first plate 10 and the second plate 11. The spot welding is performed in the direction from an inlet manifold to an outlet manifold on one side of the separator 18 and, at the same time, in the direction from an outlet manifold to an inlet manifold on the other side of the separator 18, at regular intervals.

Micro spot welding guns 24 are inserted through guide holes 23 in the upper mold 26 to weld the sealing portion 17 of the first plate 10 and the second plate 11. The lower mold 27 includes an electrode function for the spot welding.

In the spot welding process, a metal material is disposed between the electrodes and a contact portion is pressurized while applying electric current thereto, thus fusing the pressurized portion by resistance heat generated on the contact portion. Accordingly, a plurality of coolant flow paths 28 for cooling the resistance heat transferred to the upper and lower molds 26 and 27 are provided in the molds 26 and 27.

Moreover, it is possible to maintain the airtightness for each channel by performing the compound 15 application and the spot welding between a hydrogen manifold 22, coolant manifold 21 and oxygen manifold 20.

With the configuration as described above, it is possible to automate the compound 15 application and the spot welding for maintaining the airtightness for the respective edges and channels of the separator 17, thus facilitating mass production. Moreover, since the upper and lower molds are manufactured in the same trapezoidal shape as the separator and the spot welding process is performed from the symmetrical position sequentially and simultaneously, it is also possible to increase the rigidity of the separator, minimize thermal deformation, and provide springback compensation by the molding process.

Furthermore, it is further possible to fix the coolant flow paths 12 formed on the separator 18 by the spot welding process, provide compensation by mold modification, and facilitate the stacking process to increase the rigidity of the separator 18.

While preferred embodiments of the present invention have been described and illustrated, the present invention is not limited thereto. On the contrary, it should be understood that various modifications and variations of the present invention can be made by those skilled in the art without departing from the spirit and the technical scope of the present invention as defined by the appended claims.

What is claimed is:

1. A method of manufacturing a metal separator for a fuel cell, comprising:

forming a first plate and a second plate wherein each plate has at least one concave portion and at least one convex portion;

providing an upper mold and a lower mold, wherein one of the upper and lower molds includes a trapezoidal projection and the other of the upper and lower molds includes a recess having a shape corresponding to that of the projection;

arranging the first and second plates in the upper and lower molds, respectively, such that the concave portion of the first plate is opposite the convex portion of the second plate and the convex portion of the first plate is opposite the concave portion of the second plate;

applying a sealant between the first and second plates arranged in the upper and lower molds; and spot welding the first and second plates together while positioned in the first and second molds, respectively, wherein a spot welding gun is inserted through a guide hole formed in one of the upper and lower molds, and wherein the other of the upper and lower molds serves as an electrode for the spot welding;

wherein the first and second plates are attached at a sealing portion, and wherein the sealant comprises applying the sealant at the sealing portion;

wherein the sealing portion is disposed in a space formed between the projection of the first mold and the recess of the second mold; and wherein the spot welding gun is inserted through the guide hole in one of the molds.

2. The method of claim 1, wherein the sealing portion is near an edge of the separator.

3. The method of claim 1, wherein the sealing portion is disposed between a hydrogen manifold, an oxygen manifold, and a coolant manifold.

4. The method of claim 1, further comprising sealant leakage prevention grooves formed in the lower mold on opposing sides of the trapezoidal projection to prevent leakage of the sealant beyond the sealant leakage prevention grooves.

* * * * *